Jan. 19, 1960 F. JACKEL 2,921,449
ELASTIC SHAFT COUPLING
Filed July 16, 1958 2 Sheets-Sheet 1
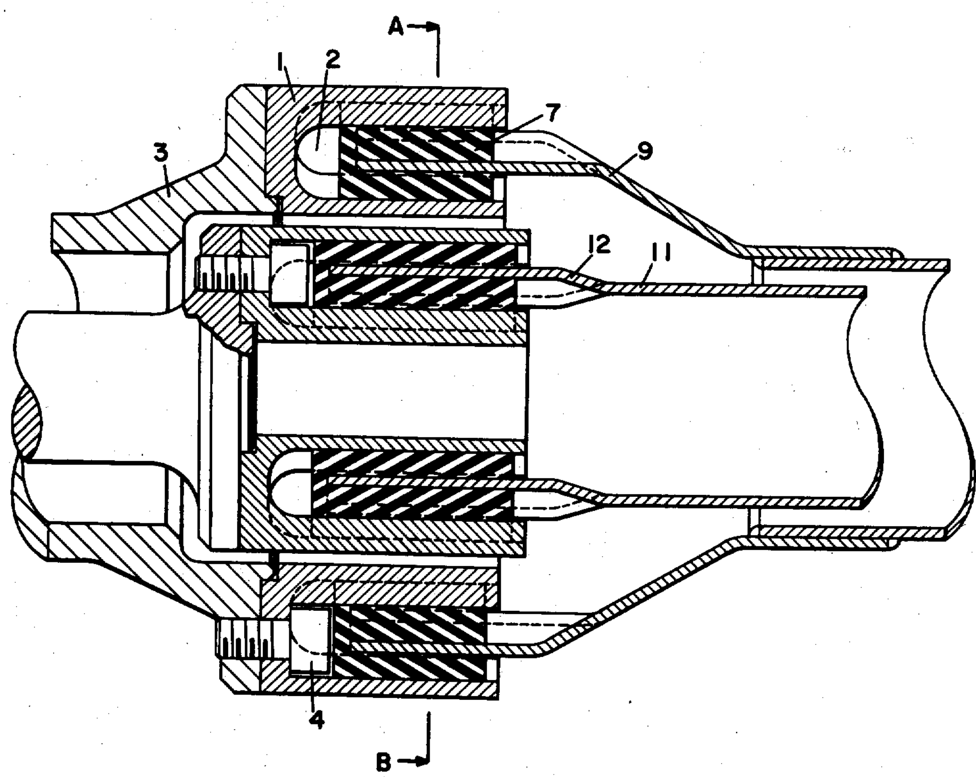
FIGURE I

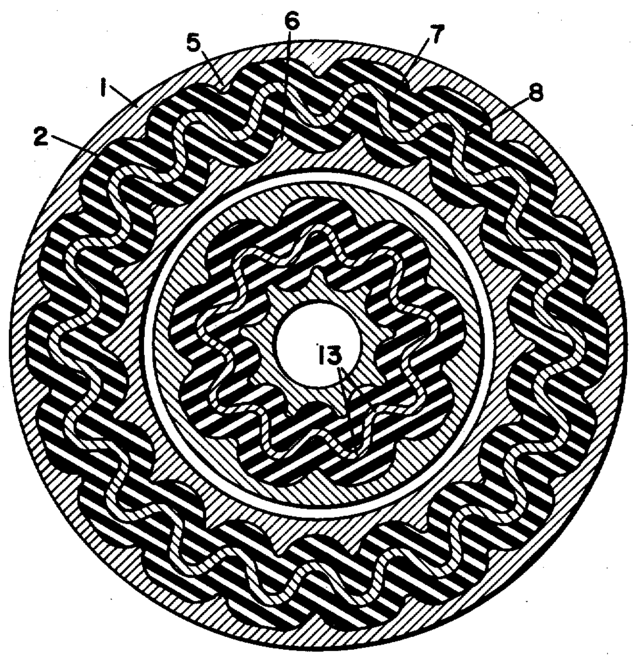
FIGURE II
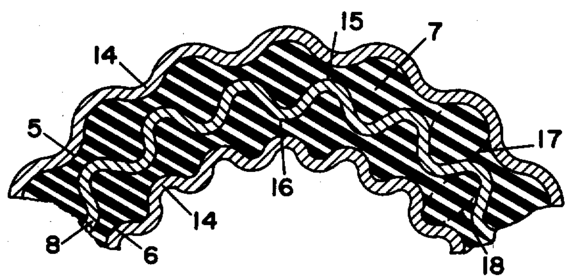
FIGURE III

United States Patent Office 2,921,449

Patented Jan. 19, 1960

2,921,449

ELASTIC SHAFT COUPLING

Fritz Jackel, Bielefeld, Germany

Application July 16, 1958, Serial No. 748,917

Claims priority, application Germany July 19, 1957

14 Claims. (Cl. 64—13)

This invention relates to an elastic shaft coupling. More particularly, the invention is concerned with an elastic shaft coupling of the gear coupling variety.

Gear couplings containing an elastic cushioning material are well known in the art. In general, the elastic cushioning material consists of rubber pieces disposed between the flanks of the gear wheel teeth. In order to keep the specific surface pressure exerted on the elastic cushioning material below a critical maximum value, rubber pieces of comparatively large dimensions are required. As a result, the conventional gear couplings using an elastic cushioning material are rather clumsy and occupy so much space as to be of limited utility.

It is therefore a primary object of the present invention to provide an elastic shaft coupling which, although capable of transmitting high torque, is of compact construction. Another object of this invention is to provide a relatively small coupling of the gear type which is flexible and capable of handling angular as well as parallel misalignments of the shafts. A further object is to provide an elastic shaft coupling which is inexpensive to make and of such a design as to permit an easy replacement of those parts which are subject to wear and tear. Still further objects will become apparent from the following description with reference to the accompanying drawing which illustrates certain preferred shaft couplings made in accordance with and embodying this invention.

In the drawing:

Figure I is a longitudinal sectional view of two elastic shaft couplings constructed in accordance with one embodiment of the invention, one of said couplings being disposed within the other.

Figure II is a cross-sectional view taken along line A—B of Figure I.

Figure III is a fragmentary cross-sectional view of another embodiment of the invention.

In accordance with this invention, generally speaking, the foregoing objects and others are accomplished by providing a shaft coupling comprising two interlocking coupling members separated by an elastic transmitting material, one of said coupling members being formed by a profiled pipe end having wave-shaped teeth and the other of said coupling members having a circular opening defined by two opposite rows of wave-shaped teeth, said circular opening enclosing said elastic transmitting material, said elastic transmitting material having a circular wave-shaped groove, said profiled pipe end projecting and fitting into said groove.

It is an important feature of the present invention that the elastic transmitting material acting as a cushion between the two coupling members is easily replaceable.

In a specific embodiment of the present invention, the teeth of the projecting coupling member are aligned with the teeth of the receiving coupling member. Stated somewhat differently, the circular groove contained in the elastic transmitting material divides the same into two halves of uniform wave-shaped cross-section.

In another embodiment of the present invention, the teeth of the projecting coupling member are staggered or offset with respect to the teeth of the receiving coupling member. State somewhat differently, the circular groove contained in the elastic transmitting material divides the same into two halves of irregular, onion-shaped cross-section. When constructed in accordance with this embodiment of the invention, the coupling will have increased torsional elasticity.

Although the coupling member containing the elastic transmitting material can be made in any desired manner, it has been found advantageous to use a drawn sheet metal body of U-shaped cross-section, said sheet metal body having a wavy profile.

If the drive shaft or power supply shaft is hollow, its end may be given a wave-shaped profile so as to form the coupling member which projects and fits into the other coupling member.

The particular design of the shaft couplings of the present invention makes it possible to mount a smaller coupling unit within a larger coupling unit. In this manner, a plurality of shaft couplings can be combined for the construction of coaxial drives.

Referring to the drawing and in particular to Figures I and II, the coupling member 1, which has a U-shaped cross-section, is provided with the wave-shaped opening 2. By means of the screws 4 the coupling member 1 is attached to the shaft flange 3. The wave-shaped opening 2 forms two opposite rows of teeth, 5 and 6, in the walls of the coupling member 1. The ring 7 consisting of a hard elastic material, such as polyurethane rubber, has a profile corresponding to that of the opening 2 and is inserted in the latter.

The ring 7 is provided with the circular wave-shaped groove 8. The coupling member 9 formed by a profiled pipe end having wave-shaped teeth projects and fits into the circular groove 8. It will be noted that the teeth of the projecting coupling member 9 are aligned with the teeth of the receiving coupling member 1 and that both halves of the ring 7 serving as the elastic transmitting material have a uniform wave-shaped cross-section. The coupling member 9 is welded to the shaft 10, which may be either the drive shaft or the power supply shaft.

If the drive or power supply shaft is hollow, such as the shaft 11, its end 12 may be given a wave-shaped profile so as to form one of the two engaging coupling members, as shown in Figures I and II.

The elastic ring 7 is prevented from travelling back and forth in the opening 2 by the screws 4 supporting it on one side and by the coupling member 9 extending to the bottom of the central groove 8 on th opposite side.

In the shaft coupling shown in Figure III, the drawn sheet metal body 14 forms the U-shaped casing for the elastic ring 7. This embodiment of the present invention is particularly inexpensive since the teeth can be made in a much simpler manner. A very important feature of the shaft coupling illustrated in Figure III is the fact that the teeth 15, 16 of the pipe end 9 are staggered with respect to the teeth 5, 6 of the coupling member 14 so as to form the relatively large onion-shaped spaces 17, 18 filled with the elastic transmitting material. As a result, a shaft coupling constructed in accordance with this embodiment of the present inventon has enhanced torsional elasticity.

As shown in Figures I and II, a plurality of shaft couplings according to the invention can be combined, if the shafts are hollow. Such a combination is useful in the construction of coaxial drives.

Owing to the particular design of the coupling members used in the elastic couplings of the present invention, both the exterior and the interior sides of their wavy ends serve the power transmission. This means that the power to be transmitted is distributed over a relatively large elastic surface. Being surrounded on both sides, the parts to be turned or driven are so well centered that an auxiliary centering means has proven unnecessary even if the number of revolutions per minute is very high.

The elastic ring serving as the cushion between the two interlocking coupling members may consist of any suitable material. Materials that combine elasticity with abrasion resistance are preferred materials of construction for the cushion. A particularly suitable elastic transmitting material is polyurethane rubber made by processes that are known per se (see for example U.S. Patents 2,620,516; 2,621,166; 2,729,618; 2,764,565 and 2,778,810). The following example describes a procedure to make a polyurethane rubber of the required elasticity and hardness but it is to be understood that any other suitable formulation may also be utilized.

*Example*

1,000 parts by weight of an hydroxyl polyester obtained by thermal esterification of about 11 mols of adipic acid with about 12 mols of ethylene glycol and having an hydroxyl number of about 52 and an acid number of about 1 are heated at a temperature of about 135° C. and under a vacuum of about 12 mm. until the formation of bubbles has stopped and the polyester is completely free from water. Now, 300 parts by weight of naphthylene-1,5-diisocyanate are added at 135° C. while stirring. As soon as the temperature starts to drop, 70 parts by weight of butylene glycol-1,4 are stirred into the mixture at about 135° C. The resulting mixture is poured into a mold and maintained therein at a temperature of about 110° C. for about 24 hours to form a polyurethane rubber having the following characteristics:

| | |
|---|---|
| Tensile strength ____kg./cm.$^2$ | 381 |
| Elongation at break ____percent | 625 |
| Permanent set ____do | 12 |
| Tear resistance ____kg./cm.$^2$ | 96 |
| Resiliency | 39 |
| Load at 300% elongation | 86 |
| Shore hardness | 81 |

While certain representative embodiments and details have been shown for the purpose of illustrating this invention, it will be apparent to those skilled in this art that various changes and modifications may be made therein without departing from the spirit and the scope of the invention.

What is claimed is:

1. An elastic shaft coupling comprising two interlocking coupling members separated by an elastic transmitting material, one of said coupling members being formed by a profiled pipe end having wave-shaped teeth and the other of said coupling members having a circular opening defined by two opposite rows of wave-shaped teeth, said circular opening enclosing said elastic transmitting material, said elastic transmitting material having a circular wave-shaped groove, said profiled pipe end projecting and fitting into said groove so that the teeth formed by said wave-shaped groove in said elastic transmitting material intermesh with the teeth of said coupling members.

2. An elastic shaft coupling as defined in claim 1 wherein the teeth of the projecting coupling member are aligned with the teeth of the receiving coupling member.

3. An elastic shaft coupling as defined in claim 1 wherein the teeth of the projecting coupling member are staggered with respect to the teeth of the receiving coupling member.

4. An elastic shaft coupling as defined in claim 1 wherein said elastic transmitting material is a grooved ring of polyurethane rubber.

5. An elastic shaft coupling of the gear coupling variety for attaching two shaft ends comprising a first coupling member of U-shaped cross-section having wave-shaped teeth on both legs of the U-profile, a second coupling member formed by a pipe end having wave-shaped teeth, and an elastic transmitting member provided with a wave-shaped substantially circular groove surrounding said second coupling member on both sides to intermesh with the teeth of both said coupling members when said second coupling member is inserted into said first coupling member.

6. The elastic shaft coupling of claim 5 wherein said elastic transmitting member is an elastic ring provided with a closed wave-shaped groove, said elastic ring being disposed in said U-shaped coupling member.

7. The elastic shaft coupling of claim 5 wherein said first coupling member is formed of a drawn sheet metal body having a U-shaped cross-section and a wavelike configuration.

8. The elastic shaft coupling of claim 5 wherein both said coupling members are equally toothed and the teeth of one of the coupling members are staggered with respect to the teeth on the other coupling member to form essentially oval-shaped spaces filled with the elastic transmitting material of said elastic member.

9. The elastic shaft coupling of claim 5 wherein said second coupling member is formed by the end of a hollow drive shaft.

10. An elastic shaft coupling in accordance with claim 5 wherein said first coupling member is a ring member having inner and outer essentially parallel faces and characterized by a groove in said inner face, said groove being of essentially constant depth and of closed wavelike configuration substantially concentric with the axis of said ring member.

11. An elastic shaft coupling in accordance with claim 10 wherein a second coupling is disposed within said coupling so as to be suitable for use in the construction of coaxial drives.

12. A flexible coupling device for attaching a pair of rigid shafts which comprises a first coupling member having an interlocking surface having therein a groove of lateral wavelike configuration, connecting means associated with said first coupling member to rigidly attach said member to a shaft, an abrasion-resistant resilient member disposed within said groove, said resilient member having a U-shaped cross-section and a wavelike configuration adapted to closely fit within said groove in said coupling member, and a second coupling member adapted for rigid mounting on a second shaft, said second coupling member being provided with longitudinal corrugations which project into said groove in said first coupling member and intermesh with said first member by frictional contact with both legs of said U-shaped resilient member.

13. A flexible coupling device comprising a disc member having inner and outer essentially parallel faces and characterized by a groove in said inner face, said groove being of essentially constant depth and of closed wavelike configuration substantially concentric with an axis of said disc normal to said faces, connecting means associated with said disc member to rigidly attach said member to a shaft, an abrasion-resistant elastic member of U-shaped cross-section having a wavelike configuration adapted to closely fit within said groove in said disc member, and a ring member adapted for rigid mounting on a second shaft, said ring member having wave-shaped teeth essentially regularly distributed around the circumference thereof which project into said U-shaped member to intermesh with both said disc member and said ring member.

14. A flexible coupling device comprising a ring member having inner and outer essentially parallel faces and characterized by a groove in said inner face, said groove being of essentially constant depth and of closed wavelike configuration substantially concentric with the axis of said ring member, connecting means associated with said ring member to rigidly attach said member to a shaft, an elastic transmitting member of U-shaped cross-section having a wavelike configuration disposed within said groove in said ring member, and a tubular coupling member adapted for rigid mounting on a second shaft, said tubular member having wave-shaped teeth essentially regularly distributed around the circumference thereof which project into said groove in said ring member and interlock with said ring member through frictional contact with both legs of said U-shaped elastic transmitting material.

References Cited in the file of this patent

UNITED STATES PATENTS

| | | |
|---|---|---|
| 2,084,080 | D'Aubarede | June 15, 1937 |
| 2,560,644 | Hartzell | July 17, 1951 |
| 2,790,312 | Hagenlocher et al. | Apr. 30, 1957 |